United States Patent [19]

Philippe et al.

[11] Patent Number: 5,837,993
[45] Date of Patent: Nov. 17, 1998

[54] NETWORK OF PHOTOSENSITIVE CELLS AND IMAGE SENSOR INCLUDING SUCH A NETWORK

[75] Inventors: Venier Philippe, Cordast; Arreguit Xavier, Le Mont, both of Switzerland

[73] Assignee: CSEM-Centre Suisse D'Electroniuqe et de Microtechnique SA, Neuchatel, Switzerland

[21] Appl. No.: 804,067

[22] Filed: Feb. 21, 1997

[30]    Foreign Application Priority Data

Feb. 23, 1996 [FR] France ................................. 96 02268

[51] Int. Cl.⁶ .................................................. H01L 27/00
[52] U.S. Cl. ...................................... 250/208.1; 348/294
[58] Field of Search ........................... 250/208.1, 214 R, 250/214 AG, 214 L, 216; 327/514, 515; 257/291, 292, 443; 348/294, 308

[56]    References Cited

U.S. PATENT DOCUMENTS

| 4,400,729 | 8/1983 | Jones . | |
|---|---|---|---|
| 5,130,563 | 7/1992 | Nabet et al. . | |
| 5,187,581 | 2/1993 | Kamatani . | |
| 5,572,074 | 11/1996 | Standley ............................... | 250/208.1 |

OTHER PUBLICATIONS

"CCD Imaging Device with Center–Weighted Area Averaging", IBM Technical Disclosure Bulletin, vol. 34, No. 7A (1991), pp. 392–395.

*Primary Examiner*—Edward Westin
*Assistant Examiner*—Kevin Pyo

[57]    ABSTRACT

In this network, each cell ($k_n$) receives a current ($I_{ph}(k)$) from a photodetector (12) and provides an output current ($S_n$) representative of the local constrast in the zone in which this cell is situated. According to the invention, each cell comprises adjustable conductances determining an output current ($I_{out}(k)$) depending in a monotonic increasing saturating manner of the ratio between photodetector current ($I_{ph}(k)$) and a mean current ($I_{mean}(k)$), said ratio representing the local contrast at the cell under consideration. The first of the conductances (P2) is regulated by the current ($I_{ph}(k)$) flowing in the photodetector. Calculating means in each cell generate a mean current ($I_{mean}(k)$) from the currents flowing in the photodetectors of the relevant cell and in at least some of the neighboring cells. This current is representative of the mean illumination to which the network is subjected. The conductances ($P_{4a}$, $P_{5a}$) are regulated by the mean current ($I_{mean}(k)$). This network makes it possible to create image sensors which process illumination in a manner akin to that afforded by the biological retina of vertebrates.

17 Claims, 6 Drawing Sheets

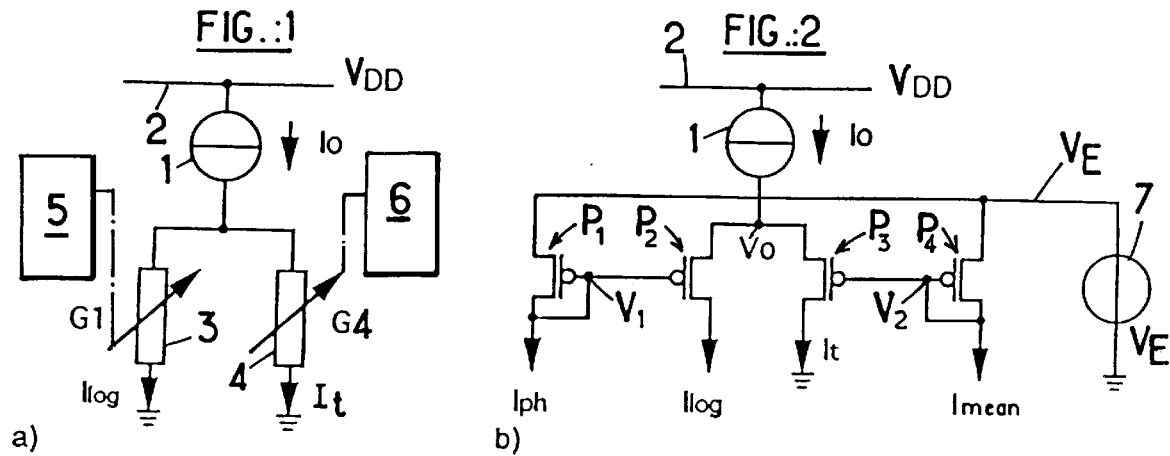
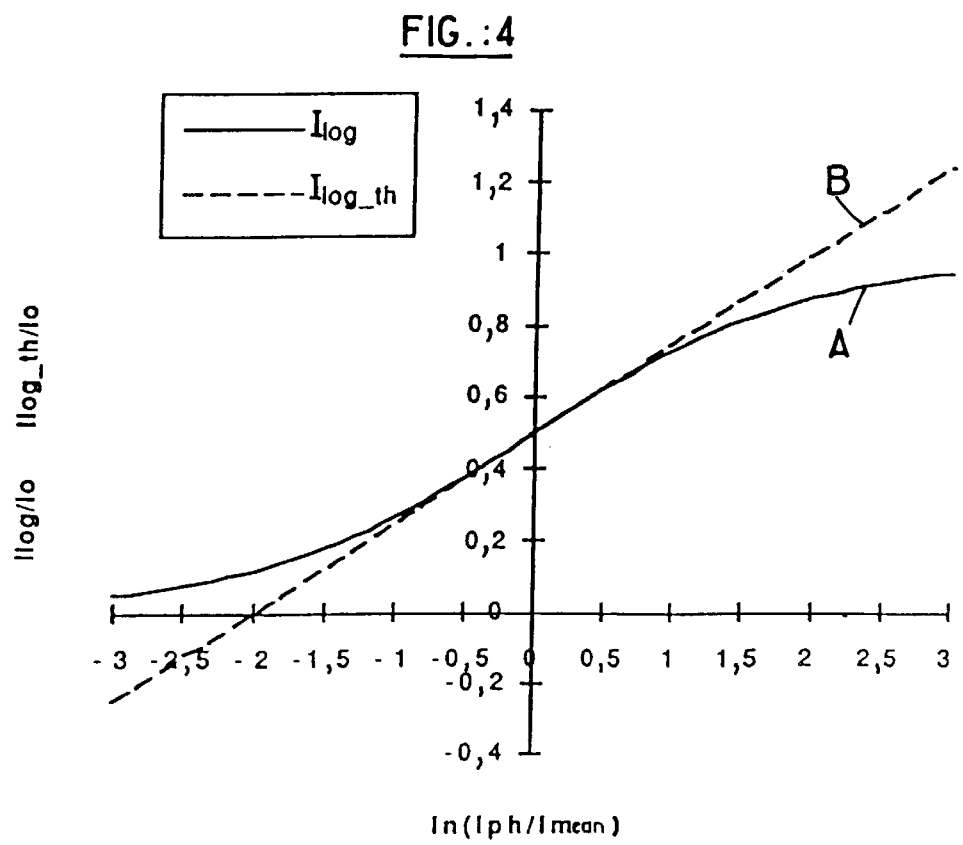

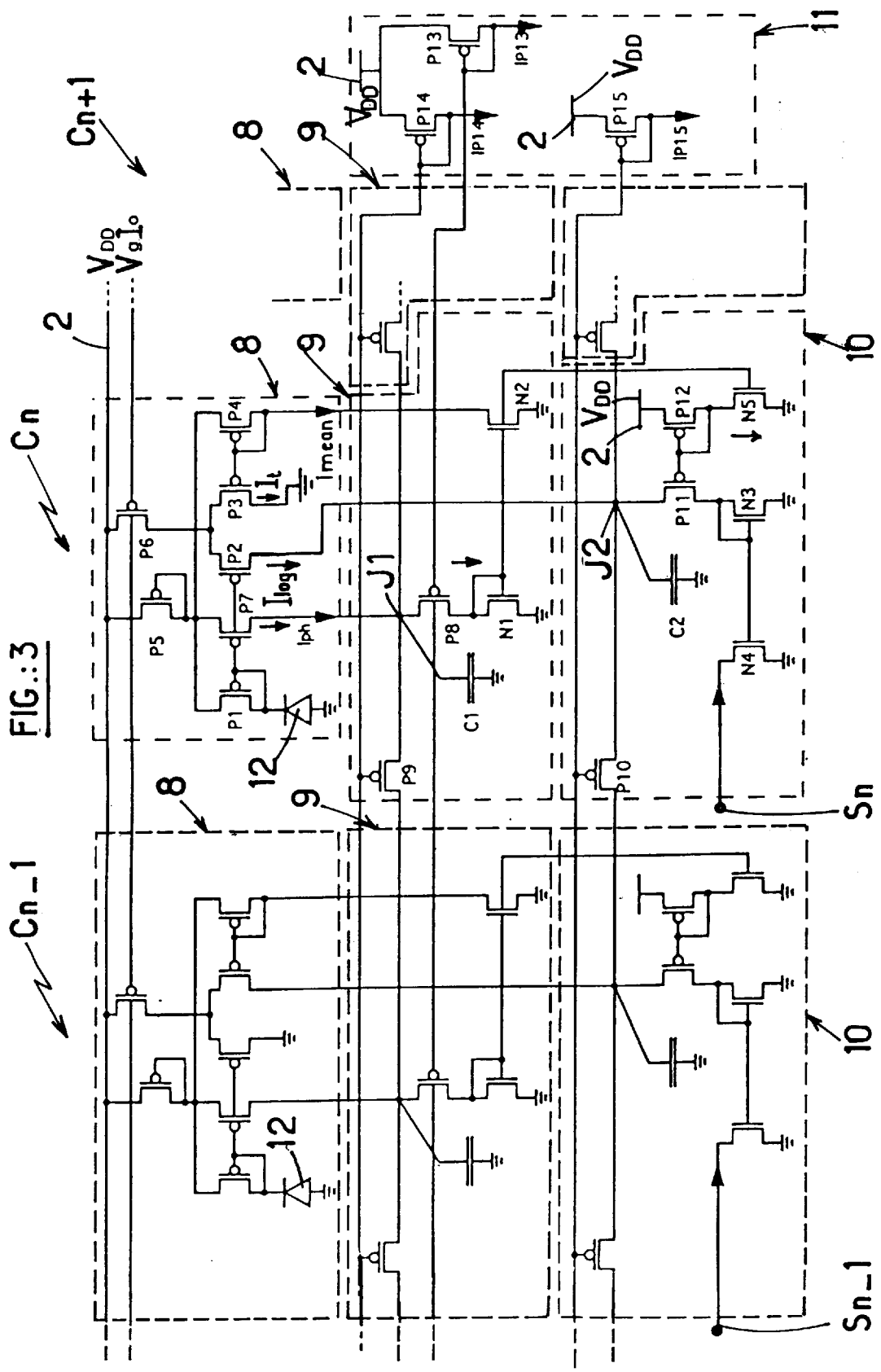

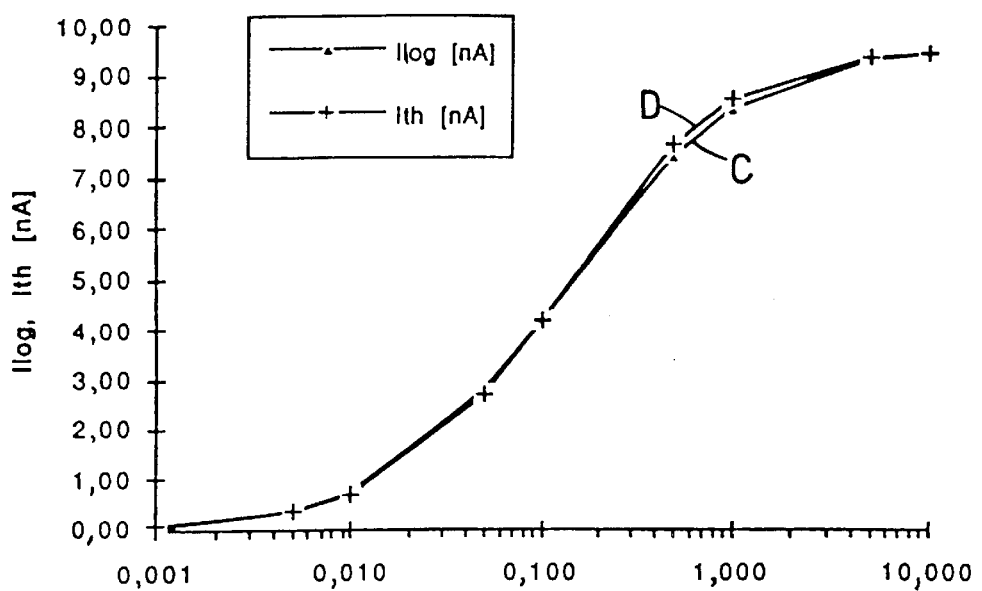
FIG.:5
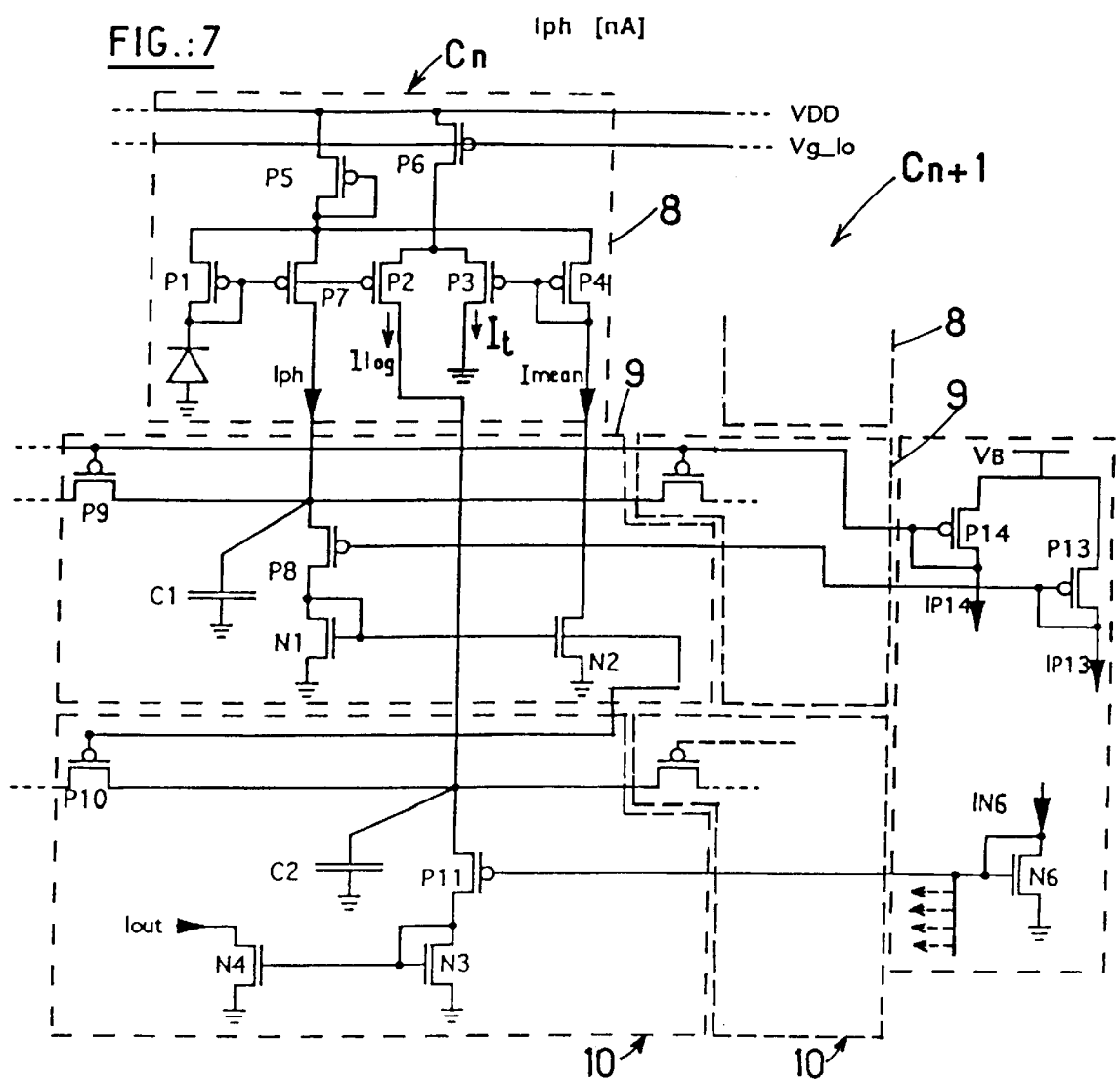
FIG.:7

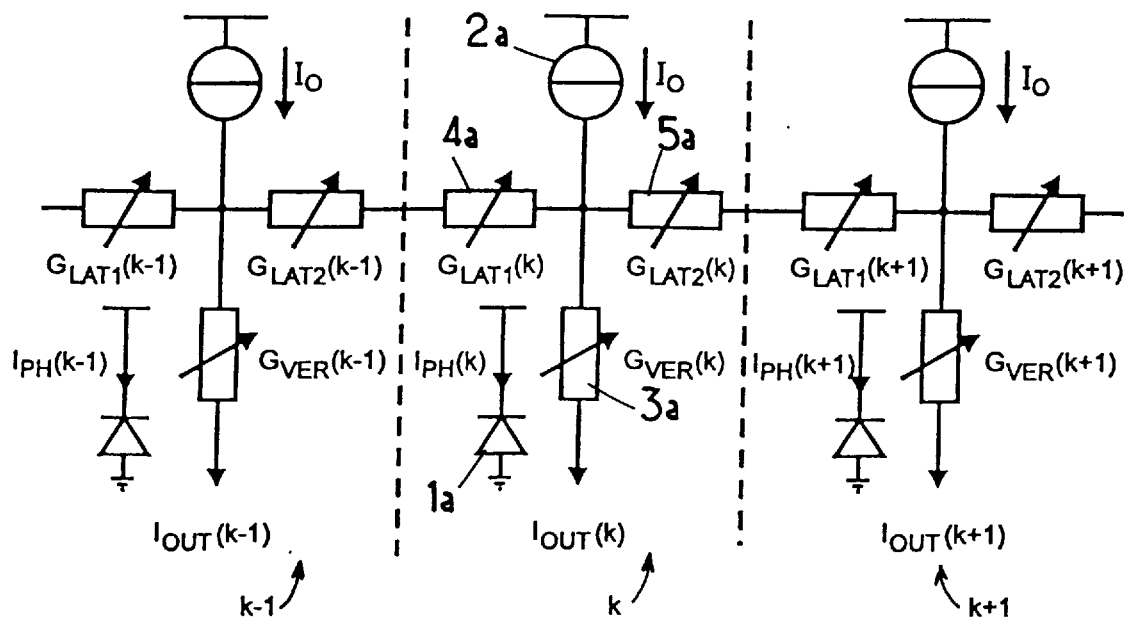
FIG.:8
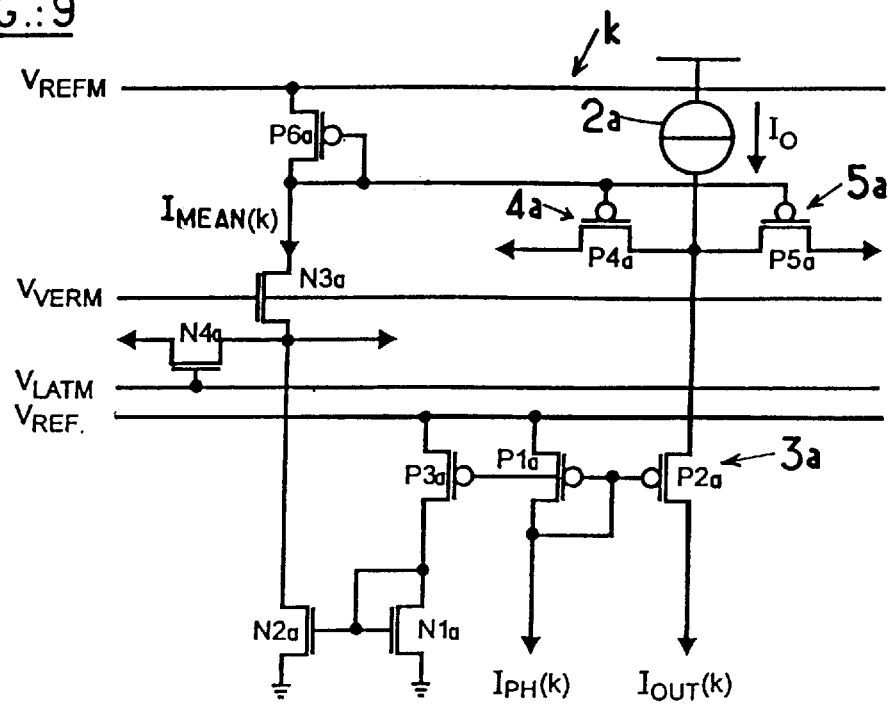
FIG.:9

NETWORK OF PHOTOSENSITIVE CELLS AND IMAGE SENSOR INCLUDING SUCH A NETWORK

FIELD OF THE INVENTION

The present invention relates to a network of photosensitive cells in which each cell is intended to provide an output signal representing the local contrast in the zone in which this cell is situated within the network. More particularly, the invention relates to an image sensor formed from such a network of photoreceptors for converting light received into a set of signals representative of the spatial photon energy contained in this light.

BACKGROUND OF THE INVENTION

Such an image sensor is of the type which by analogy with the biological eye may be termed an "artificial retina", a photoreceptor device which is capable of transforming photon energy packets into electrical "nerve" signals which can then be processed in whatever form it may be, representative of the light which strikes this photoreceptor device.

The photoreceptor device must comprise sensors affording photoelectric conversion of the light reflected by the scene being pictured. These sensors make it possible to obtain signals proportional to the luminance $L(x)$ of the vectors x of this scene. The luminance $L(x)$ is proportional to the illumination $E(x)$ of the scene and to the reflection coefficient $\rho(x)$ of the surfaces of the objects which make up the scene. For perceptive processing, the important parameter is the reflection coefficient since it characterizes the surface of the various objects independently of the type of illumination.

When the illumination is not constant for the whole scene, the reflection coefficient cannot be deduced simply from the luminance. An assumption has to be made regarding the type of illumination $E(x)$. Under actual conditions of lighting, the illumination may be supposed locally constant.

Whence, for each point of the scene, by calculating the local contrast, that is to say the ratio of luminance $L(x)$ to a local mean value $L_{mean}(x)$ of the luminance, a quantity is obtained which is directly proportional to the reflection coefficient $\rho(x)$.

For images captured with CCD or CMOS sensors, this type of processing can be applied, but it will only be possible to perform it correctly if the image contains the entire dynamic range of the luminance of the scene examined, akin to what occurs with the processing performed at the level of the biological retina.

Now, the ambient conditions of illumination may vary in very wide proportions, typically by seven orders of magnitude, when considering for example on the one hand the light of a moonless night, and on the other hand full sunlight.

To obtain correct processing it is therefore necessary that no part of the image captured be either over- or underexposed. For actual scenes, situations of over- or underexposure of a part of the image are very frequent and it is not therefore possible to retrieve the reflection coefficient $\rho(x)$ a posteriori. Moreover, calculated with conventional, digital or sequential means, this processing takes too much time to allow real-time perceptive processing.

The aim of the invention is to propose a network of photosensitive cells making it possible to calculate the reflection coefficient of surfaces of the observed scene, avoiding the problems of over- and under-exposure related to the calculation time.

The subject of the invention is therefore a network of photosensitive cells each cell of which is intended to provide an output signal representative of the contrast in the zone in which this cell is situated within the network, wherein each cell comprises:

a photosensitive element delivering a current representative of the local illumination in said zone;

a first calculating circuit which, from said representative current and from predetermined quotas of the representative currents developed in at least some of the neighboring cells in the network of the relevant cell, generates a mean current;

a second calculating circuit which, on the basis of said representative current and of said mean current, generates a measurement current which depends in a monotonic increasing and saturating manner on the ratio of the representative current to the mean current, the said ratio representing the local contrast of the relevant cell, and means for generating said output signal as a function of said measurement current.

By virtue of these characteristics, the calculation of the reflection coefficient is performed locally in each cell or pixel of the retina. It thus becomes possible to have in one and the same network or retina several zones each working at levels of illumination which differ by several orders of magnitude. Moreover, the determination of the reflection coefficient is performed instantaneously and simultaneously for all the cells of the network, so that real-time processing is possible.

Furthermore, while affording satisfactory sensitivity of the network at the level of each cell, it is also possible by virtue of the invention to obtain in the network of cells a good compromise between the spatio-temporal resolution and the signal/noise ratio of the output signals in particular in the region of weak illuminations. Furthermore, the network of cells according to the invention makes it possible to limit the number of active components of each cell to a minimal value.

The network according to the invention exhibits a large capacity to adapt to the conditions of illumination of actual scenes making it possible to extract from the incident luminance an item of information about the surfaces of the objects of the scene independently of the type of illumination.

Furthermore, the processing performed in each cell of the network is in current mode, each cell providing at its output an information item formed by a current. Such an information item can be exploited directly by current frequency conversion.

In a doctoral thesis published in June 1994 by the Institut Polytechnique de Grenoble, France and entitled "Le traitement neuronal de l'information dans la rétine des vertébrés: un creuset d'idées pour la vision artificielle" [The neural processing of information in the retina of vertebrates: a miscellany of ideas relating to artificial vision], W. Beaudot (Laboratoire de Traitement d'Images et de Reconnaissance de Formes de Grenoble, France) analyzed the transfer function of the retina of vertebrates. It turned out that the response of a biological photoreceptor exhibits the form of a bundle of sigmoids each of which represents the pseudologarithmic compression of the illumination for a particular level of the latter following the Michaelis-Mentejn law.

In the remainder of the description, compression, conversion or sigmoidal transfer function will denote the compression or transfer functions corresponding or equivalent to the latter type.

The author of the thesis also proposes an equivalent electrical model enabling such a response to be obtained. This equivalent model therefore takes into account the Michaelis-Menten law dynamically monitored while allowing an adaptation of this law as a function of statistical characteristics of the light which is to be transcoded into utilizable signals. This transcoding amounts in fact to the sensitivity of each photoreceptor being locally altered in the network as a function of the mean intensity and of the standard deviation of the light intensity, these being estimated locally. However, the aforementioned work tenders no practical implementation of the electrical model thus proposed.

Thus, according to a first embodiment of the invention said second calculating circuit is arranged so as to generate said measurement current in such a way that it results from a sigmoidal compression of said ratio between the current representative of the local illumination and said mean current.

However, according to a second embodiment of the invention, said second calculating circuit is arranged so as to generate said measurement current according to the equation:

$$I_{out}(k, l) \cong I_0 \cdot \int_{k, l} f_R(k, l) \cdot$$

$$\frac{I_{ph}(k, l)}{f_R(k, l) * I_{ph}(k, l)} \cong I_0 \int_{k, l} f_R(k, l) \cdot \frac{I_{ph}(k, l)}{I_{mean}(k, l)}$$

in which: $I_{out}$ measurement current;
  k and l X and Y indices of a relevant cell in the two-dimensional network;
  $I_0$ current delivered by a current source provided in each relevant cell;
  $f_R$ convolution kernel of Gaussian shape
  $I_{ph}$ current in the photoreceptor
  $I_{mean}$ mean current It will be noted that, in this second embodiment of the invention, for those values of the current $I_{ph}$ which are close to the current $I_{mean}$, the measurement current $I_{out}$ is proportional to the ratio $I_{ph}/I_{mean}$, that is to say proportional to the local contrast. For values of the current $I_{ph}$ which are respectively much less than and much greater than the current $I_{mean}$, the measurement current $I_{out}$ tends to zero and to $\int_k f_R(k,l) * I_0$, which value is a multiple of the current $I_0$. This second embodiment therefore makes it possible also to obtain a measurement current of monotonic increasing and saturating shape.

Additionally, it should be pointed out that it is known from the patent U.S. Pat. No. 4,400,729 relating to a network of photosensitive cells of the type of the present invention, to make a correction to the output signal from each cell by using the image information item of the neighboring cells. For this purpose, the signals developed by the photosensitive elements are subjected to a calculation of the median value of the differences obtained from the signals provided by four adjacent cells in the network. This therefore involves a calculation process which differs from that applied in the network according to the present invention. Furthermore, the earlier document makes no mention of the production of a measurement curre3t with monotonic increasing and saturating function.

BRIEF DESCRIPTION OF THE DRAWINGS

Other characteristics and advantages of the invention will emerge in the course of the description which follows, given merely by way of example and made with reference to the appended drawings in which:

FIG. 1 is a symbolic diagram illustrating the principle upon which the operation of the first embodiment of the present invention is based;

FIG. 2 is a more elaborate diagram illustrating this same basic principle;

FIG. 3 is a detailed diagram of a few cells of an image sensor using the network of cells according to the invention;

FIG. 4 is a graph showing the ratio of the currents $I_{log}$ and $I_0$ flowing in a cell of the sensor, versus the logarithm of the ratio of the currents $I_{ph}$ and $I_{mean}$, also flowing in the sensor, the curve being compared with an analog curve obtained by theoretical calculation;

FIG. 5 is a graph showing the output current $I_{log}$ from the sigmoidal compression circuit of a cell of the sensor versus the current $I_{ph}$ flowing in the photosensitive element of this cell, the curve being compared with an analog curve obtained by theoretical calculation;

FIG. 7 is a detailed diagram of a variant of the image sensor according to the first embodiment of the invention.

FIG. 8 illustrates diagrammatically the principle upon which the second embodiment of the invention is based;

FIG. 9 illustrates in a more detailed manner the basic principle represented in FIG. 8.

DESCRIPTION OF THE PREFERRED EMBODIMENTS

Figure 6A:
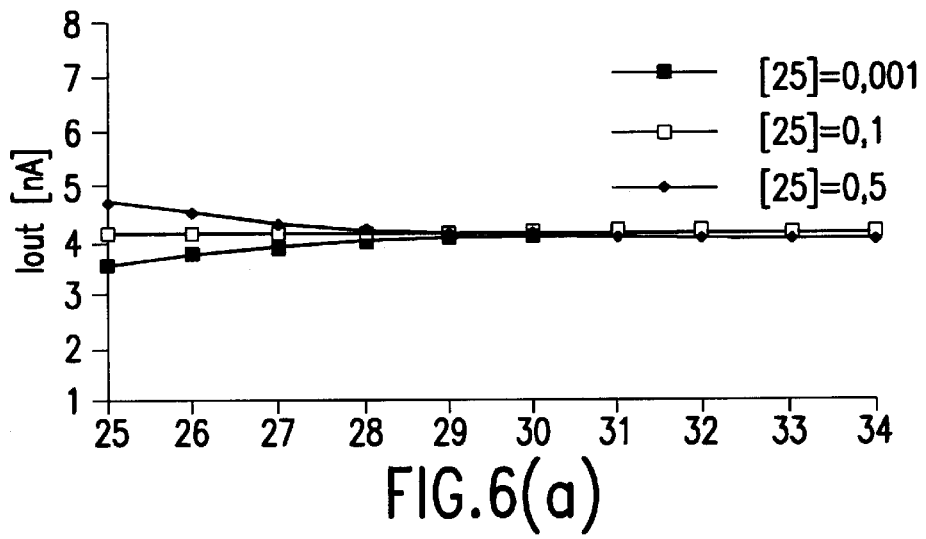
FIG. 6 shows at a), 6b) and 6c) three graphs illustrating the operation of the adaptive filter used in each cell of the image sensor according to the invention.

The image sensor according to the first embodiment of the invention (which sensor is also referred to as an "artificial retina") is designed on the basis of the theoretical model formulated by the author of the aforementioned thesis from investigations undertaken on the retinas of certain vertebrates. Hence, it employs the Michaelis-Menten law in order to carry out sigmoidal compression of the light intensity signal due to the illumination of the sensor and thus to make it possible to take account of the complete range of illumination levels (around seven orders of magnitude) which the sensor is generally liable to receive. The sigmoidal compression is carried out in intensity windows corresponding to the range of sensitivities of the photoreceptor, adaptation to a given intensity level being determined by using the mean value of the intensity with which at least one group of photoreceptors is confronted.

The Michaelis-Menten law can be expressed thus:

$$R_{log} = K \frac{1}{1 + \frac{N_0}{N}} \quad (1)$$

in which $R_{log}$ is the response of a photoreceptor, K is a constant, $N_0$ is the mean level of illumination on a group of photoreceptors of the sensor and N is the level of illumination of the relevant photoreceptor from this group.

FIG. 1 represents the principle of a circuit according to the first embodiment of the invention making it possible to implement the aforementioned law. This circuit which will be referred to as an "adaptive sigmoidal compression circuit", takes the form of a current divider and includes a current source 1 connected to a source of supply voltage $V_{DD}$ 2 and feeding a constant current $I_0$.

The current source 1 is connected to two alterable conductances 3 and 4, one as a function of a current $I_{ph}$ produced by at least one photoreceptor 5 and the other by a calculating circuit 6 which determines a current $I_{mean}$. The latter is the "mean" of the currents produced by a group of photodetectors of which the relevant photodetector forms part. This current $I_{mean}$, is representative of the mean level of illumination (the term "mean" is therefore not to be taken in the strict mathematical sense). The conductances 3 and 4 are traversed by currents labeled $I_{log}$ and $I_t$ respectively.

The current $I_{log}$ has the form:

$$I_{log} = \frac{G_1 I_0}{G_1 + G_2} \quad (2)$$

in which $G_1$ and $G_2$ are the values of the conductances 3 and 4 respectively. With $G_1 = kI_{ph}$ and $G_2 = kI_{mean}$, we obtain:

$$I_{log} = \frac{I_0}{1 + \frac{I_{mean}}{I_{ph}}} \quad (3)$$

which equation corresponds to the Michaelis-Menten law stated above.

The circuit just described can be realized by calling upon the use of various types of semiconductor technologies. In what follows, an embodiment with the aid of MOS transistors will be described by way of example. FIG. 2 shows the implementation of the basic circuit with the aid of these transistors working under weak inversion, that is to say in the part of their characteristic curve which exhibits an exponential shape.

More precisely, the adaptive compression circuit according to the invention comprises four transistors P1, P2, P3 and P4 of P type. The transistor P2 forms the conductance 3, whilst the transistor P3 forms the conductance 4. The source-drain path of the transistor P1 is traversed by the current $I_{ph}$ and its gate is joined to its drain. The source is linked to one of the terminals of a voltage source 7 providing the voltage $V_E$.

The gate of the transistor P1 is linked to that of the transistor P2 in which the controlled current $I_{log}$ flows. Its source is linked to the current source 1 providing the current $I_0$. Thus, the conductance formed by the transistor P2 is regulated by the transistor P1.

The transistor P3 is also linked to the current source 1 and its gate is linked to that of the transistor P4 whose source is at the potential $V_E$ of the voltage source 7. The source-drain path of the transistor P4 is traversed by the current $I_{mean}$ and its gate is connected to its drain. Consequently, the transistor P4 regulates the conductance formed by the transistor P3.

As far as the transistors P1 to P4 connected as indicated in FIG. 2 are concerned, the following equations may be written:

$$I_{ph} = I_{D0} e^{\frac{V_1 - nV_E}{nU_T}} \quad (4)$$

$$I_{log} = I_{D0} e^{\frac{V_1 - nV_O}{nU_T}} \quad (5)$$

$$I_t = I_{D0} e^{\frac{V_2 - nV_O}{nU_T}} \quad (6)$$

$$I_{mean} = I_{D0} e^{\frac{V_2 - nVE}{nU_T}} \quad (7)$$

in which $I_{D0}$ is the specific current of each transistor, $V_0$, $V_1$, $V_2$ are the respective potentials indicated in FIG. 2, n being the slope factor and $U_T$ the thermal potential of each transistor.

Furthermore:

$$I_{log} + I_t = I_0 \quad (8)$$

Combining equations (4) to (8) above, it follows that:

$$I_{log} = \frac{I_{ph} I_0}{I_{ph} + I_{mean}} = \frac{I_0}{1 + \frac{I_{mean}}{I_{ph}}} \quad (9)$$

which corresponds to the sought-after equation (3).

FIG. 3 represents in more detail the manner in which an image sensor according to the first embodiment of the invention is organized. The sensor includes a large number of cells connected together according to a given configuration which may be linear (as represented), hexagonal or other. In FIG. 3, three cells only of this network, namely the cells $C_n$, $C_{n-1}$, and $C_{n+1}$, have been represented diagrammatically. Since all the cells are identical, only the cells $C_{n-1}$ and $C_n$ are represented in detail.

It may be seen that cell $C_n$ comprises three functional blocks, namely the adaptive sigmoidal compression circuit 8, already described partially with regard to FIG. 2, a mean-calculating circuit 9 and an adaptive low-pass filter 10 which comprises in particular an output $S_n$ on which there appears a useful signal representative of the contrast in the zone of cell $C_n$.

Furthermore, the image sensor comprises a biasing circuit 11 which is common to all the cells of which it is composed.

In FIG. 3 may be recognized the transistors P1 to P4 which have already been examined in regard to FIG. 2. The source-drain path of the transistor P1 is linked in series with a photodiode 12 delivering the current $I_{ph}$ as a function of the illumination to which this cell is exposed locally. The voltage source 7 providing the potential $V_E$ is formed by a transistor P5 whose source is connected to the voltage source $V_{DD}$ and whose drain is linked to the sources of the transistors P1 and P4.

The current source 1 delivering the current $I_0$ is formed by a transistor P6. The gate of the latter is subjected to a potential $V_{gI0}$, whilst it, source-drain path is linked between the voltage source 2 and the sources of the transistors P2 and P3.

A transistor P7 is mounted as a current mirror with the transistor P1 and therefore delivers a current $I_{ph}$ which is the image of the current flowing in the photodiode 12.

The calculating circuit 9 forms together with its counterparts in the other cells a diffusing network (here laterally diffusing) composed of a so-called "vertical" conductance formed by a transistor P8 and of a so-called "lateral" conductance formed by a transistor P9. The node J1 between the drain-source paths of the transistors P8 and P9 is connected to the drain of the transistor P7 and it is through this node that the current $I_{ph}$ of the relevant cell is distributed laterally toward the neighboring cells through the transistors P9, and vertically through the transistor P8 of the relevant cell.

The source-drain path of the transistor P8 is connected in series with that of an earthed transistor N1 forming together with another transistor N2 a current mirror.

The transistor P8 is traversed by a current which is representative of the mean illumination striking the image sensor at least in the zone close to the relevant cell Cn. Since the transistor N2 is mounted in current mirror mode, it is traversed by a current $I_{mean}$ representative of this mean illumination. Since moreover the source-drain paths of the transistors P4 and N2 are series connected, the transistor P4 is traversed by the same current $I_{mean}$.

It should be noted that the transistor N1, apart from making it possible to replicate the current $I_{mean}$ in the transistor N2, is also able to determine the potential at which the current divider formed by the transistor, P8 and P9 works.

The diffusion length (in other words the number of cells over which the current $I_{ph}$ of the relevant cell will be felt) is determined by the ratio of the conductances of the transistors P8 and P9 according to the formula:

$$L = \sqrt{\frac{G_{P9}}{G_{P8}}} \qquad (10)$$

in which L is the diffusion length and $G_{P8}$ and $G_{P9}$ are respectively the conductances of the transistors P8 and P9. The ratio in question is fixed by the biasing circuit 11 common to all the cells.

This biasing circuit comprises two transistors P13 and P14 respectively fixing the bias of the transistors P8 and P9 of the cells. Thus, the diffusion length can be written as a ratio of currents as follows:

$$L = \sqrt{\frac{I_{P14}}{I_{P13}}} \qquad (11)$$

FIG. 4 shows a graph of the ratio $I_{log}/I_0$ resp. $I_{log-th}/I_0$ versus the value $\ln(I_{ph}/I_{mean})$, curve A showing the shape plotted on the circuit of FIG. 3 and curve B that calculated from theory. It may be seen that the sigmoidal compression effected by the circuit according to the invention follows a large part of the theoretical curve and that it extends over a little more than two orders of magnitude.

FIG. 5 is a graph showing the shape of the current $I_{log}$(curve (C), respectively $I_{log-th}$(curve D) in nanoamperes (nA) versus the current $I_{ph}$ also in nA. Curve C has been plotted in the central cell of an image sensor according to the invention composed of 50 cells in accordance with the diagram of FIG. 3, the central cell receiving a variable light intensity, whilst the other cells have been lit with constant and uniform illumination. It may be seen here that the experimental case very closely follows the theoretical case determined by the calculation according to the Michaelis-Menten law. The diffusion length L has been chosen at $10I_{log-th}$.

The adaptive low-pass filter denoted by the reference 10 in FIG. 3 and present in each cell of the image sensor according to this embodiment of the invention will now be described. This filter is intended to improve the signal/noise ratio for the weak light intensities to which the cells of the sensor may be exposed.

Like the mean-calculating circuits of the cells, the low-pass filter 10 forms together with its counterparts in the other cells a diffusing network. Thus, each filter 10 comprises a "lateral" transistor P10 and a "vertical" transistor P11 which are connected together at a node J2 to which is sent the current $I_{log}$ generated in the sigmoidal compression circuit 8 of the cell. The transistor P11 is series connected with a transistor N3 forming together with transistor N4 a current mirror making it possible to generate the output current $I_{out}$ of the cell, this output current passing into the output terminal $S_n$ of the cell. The node J2 is joined to the transistor P10 of the neighboring cell (here the cell Cn+1). A capacitor C2 is wired between the node J2 and earth.

The transistor P11 constitutes an adjustable conductance which is biased by the current $I_{mean}$ calculated in the calculating circuit 9 of the cell by way of two other transistors in series P12 and N5.

The biasing of the lateral transistors P10 of the filters of all the cells is undertaken by a transistor P15 whose gate is joined to the gates of all these lateral transistors and which forms part of the common biasing circuit 11.

It may thus be seen that the adaptive low-pass filter 10 is regulated by the current $I_{mean}$ which, as already seen, corresponds to a spatio-temporal mean of illumination at a predetermined number of neighboring cells. Since the current $I_{mean}$ varies little from one cell to another, a space constant δ can be defined with regard to a predetermined group of cells:

$$\delta = L_F^2 = \frac{G_{P10}}{G_{P11}} = \frac{I_{P15}}{I_{mean}} \qquad (12)$$

in which $L_F$ is the diffusion length of the diffusing network formed by the filters 10, $G_{P10}$ and $G_{P15}$ the conductances physically embodied by the respective transistors P10 and P15, and $I_{P15}$ the current flowing in the transistor P15 of the biasing circuit 11.

From expression (13) it may be seen that the space constant δ is inversely proportional to the mean level of illumination.

The time constant τ of the filter 10 can be defined as follows:

$$\tau = \frac{C_2}{n g_{mP11}} = \frac{C_2 U_T}{I_{P11}} \qquad (13)$$

in which n, $g_m$ and $U_T$ are characteristic parameters of the transistor P11.

It may be seen that the time constant τ also depends in an inversely proportional manner on the mean level of illumination.

In other words, both spatially and temporally, the adaptive filter 10 in each cell makes it possible to improve the signal/noise ratio for weak illumination intensities to the detriment, it is true, of the spatial and temporal resolutions of the image sensor.

Figure 6B:
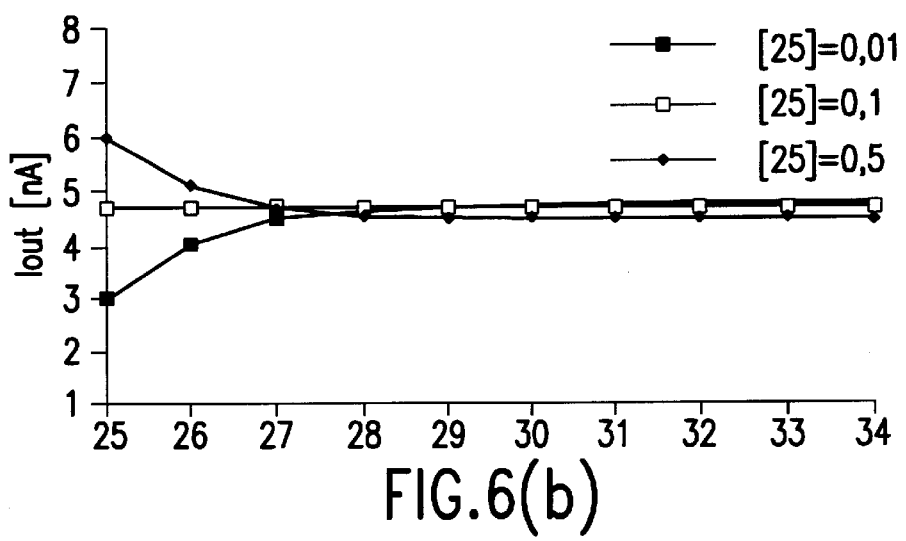
Figure 6C:
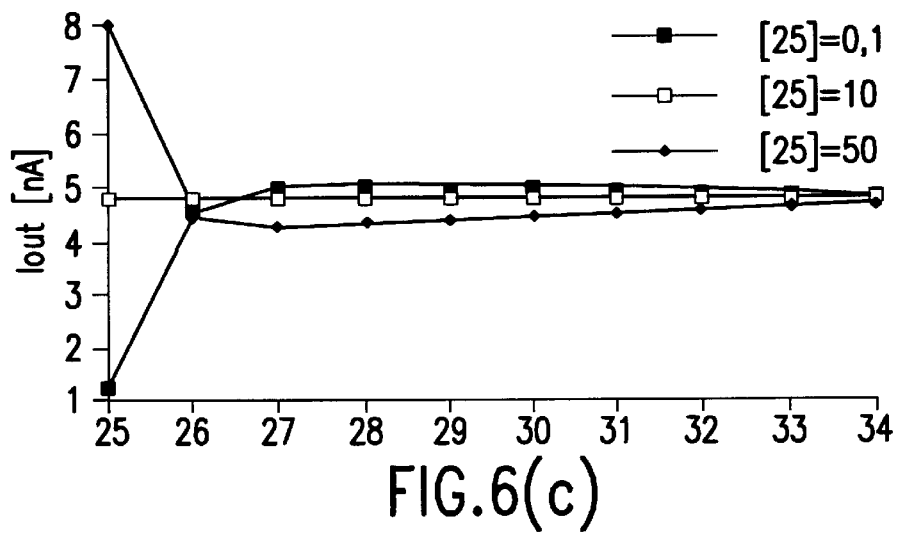

FIG. 6 illustrates the influence of the adaptive filter 10 on the result of the measurement performed by the image sensor just described. The three graphs visible at a), b) and c) relate to cells No. 25 to 34 of a one-dimensional network of 50 cells arranged as in FIG. 3, the central cell 25 being lit in a variable manner and the other cells receiving a uniform illumination. The graphs represent the output current $I_{out}$ for each of the relevant cells No. 25 to 34 and correspond respectively to a mean illumination current $I_{mean}$=100pA, $I_{mean}$=1nA and $I_{mean}$=10nA. Each graph represents three curves plotted respectively for an illumination of the central cell No. 25 such that the ratio $I_{ph}/I_{mean}$ is respectively 100, 1 and 5.

It may be seen that the weaker the current $I_{mean}$, the slower the return to the mean level and the greater the diffusion length $L_F$. The changes of the various quantities in this direction goes hand in hand with an improvement in the signal/noise ratio of the output signal.

FIG. 7 represents a variant of the first embodiment of the image sensor according to the invention. It differs from that previously described through the manner in which the adaptive low-pass filter 10 is biased. Thus, whereas in FIG. 3 it may be seen that the "vertical" branch (transistors P11 and N3) is biased by the current $I_{mean}$ via the transistors P12 and N5, in the embodiment of FIG. 7, it is the "lateral" branch which is biased by this parameter by way of the transistor N2 whose gate is linked to the gate of the transistor P10 in the same cell. Moreover, the biasing circuit includes, instead of the transistor P15, a transistor N6 which biases the transistor P11 of the adaptive filter to an identical value for all the cells.

Another variant of this first embodiment consists in using transistors of the MOS CLTB (Compatible Lateral Bipolar Transistor) type for the transistors P1 to P4 and P7 of the sigmoidal compression circuit 8, these possibly being associated with MOS transistors in cascade, according to the layouts which have been described in two works, one by X. Arreguit in thesis No. 817,1989 at the Ecole Polytechnique Fédérale de Lausanne (Switzerland), and the other by E. Vittoz in IEEE, Journal of Solid State Circuits, Vol. SC-18, No. 3, June 1983 and entitled "MOS Transistors Operated in the Lateral Bipolar Mode and their Application in CMOS Technology". From the functional standpoint, the circuits of FIGS. 3 and 7 are equivalent.

The embodiments described and represented in FIGS. 3 and 7 are said to be unidimensional in the sense that the network extends in one direction only. However, in the image of pseudo-biological neural networks known in this field, the invention also encompasses so-called multidimensional networks (of more than one dimension). For example, in a three-dimensional network, the nodes J1 and J2 could be connected to equivalent nodes situated in the cells of networks physically embodied in "planes" situated above and/or below one or other of the networks represented in FIGS. 3 and 7.

A second embodiment of the invention will now be described while referring more particularly to FIGS. 8 to 10. It will be noted that this solution makes it possible to obtain results which are entirely similar to those which the circuit of the previous figures makes it possible to achieve. However, the second solution has a further advantage in the sense that the practical embodiment is less subject to defects of the matching of the components used.

To facilitate the understanding of what follows, all the literal or numerical references bear a suffix "a" so as to be able to distinguish the corresponding components from those used in the previous embodiment.

FIG. 8 represents the principle upon which this second embodiment of the invention is based. The circuit represented makes it possible to formulate the measurement current according to the equation:

$$I_{out}(k,l) \cong I_0 \cdot \int_{k,l} f_R(k,l) \cdot \frac{I_{ph}(k,l)}{f_R(k,l) * I_{ph}(k,l)} \cong I_0 \int_{k,l} f_R(k,l) \cdot \frac{I_{ph}(k,l)}{I_{mean}(k,l)} \quad (14)$$

in which: $I_{out}$ measurement current;
  k and l X and Y indices of a relevant cell in the two-dimensional network;
  $I_o$ current delivered by a current source provided in each relevant cell;
  $f_R$ Convolution kernel of Gaussian shape
  $I_{ph}$ Current in the photoreceptor
  $I_{mean}$ Mean current FIG. 8 shows the highly simplified diagram of 3 cells or pixels k−1, k+1 of a photosensitive network or retina and which here are arranged in the form of a one-dimensional network. Each cell comprises a photosensitive element 1a such as a photodiode for example delivering the current $I_{ph}(k)$ as well as a constant-current source 2a delivering the current $I_0$ of this cell or pixel.

Each cell represents a vertical conductance 3a or $G_{VER}(K)$ through which passes the calculated measurement current $I_{out}(k)$ constituting the output signal from the pixel. The junction node between the current source 2a and the vertical conductance 3a is linked to two lateral conductances 4a and 5a or GLAT1(k) and GLAT2(k) which are connected respectively to the lateral conductances of the left and right neighboring cells. The principle of operation consists in modifying the conductances 3a, 4a and 5a as a function of the global image projected onto the network.

The current $I_{ph}(k)$ is proportional to the incident luminance L(k) which proportionally modulates the value of the vertical conductance 3a. Moreover, the network includes means (not represented in FIG. 8, but described later) which make it possible to compute a spatial mean of the current $I_{ph}$ of the neighboring cells for the mean current $I_{mean}(k)$ making it possible to modulate the lateral conductances 4a and 5a in each cell k.

It turns out that this design of the network makes it possible to obtain a measurement current $I_{out}(k)$ for each pixel proportional to the ratio of the luminance L(k) to a local mean value of the luminance, so that the network becomes able to deliver a satisfactory global output signal, even if the levels of luminance striking the various zones of the network differ by several orders of magnitude.

Represented in FIG. 9 is an example of an implementation of the second embodiment of the invention.

The vertical conductance is embodiment by a transistor P2a operating in weak inversion, its gate potential being controlled by the transistor P1a which is traversed by the current originating from the photosensitive element (not represented in FIG. 9).

The lateral conductances 4a and 5a are respectively embodied by the transistors P4a and P5a operating likewise in weak inversion, the gate potential being controlled by the transistor P6a which is traversed by the current $I_{mean}$. The mean current $I_{mean}$ is obtained by way of the current-mirror-mounted transistors N1a and N2a and of the transistor N4a which is linked by its drain-source path to the corresponding transistors of the neighboring cells.

By making simplifying assumptions about distribution of the currents $I_{ph}(k)$, it is possible to prove that the size of the zone over which the normalizing of the useful signal takes place, is independent of the absolute level of the luminance and is fixed by the following space constant C:

$$C = \sqrt{\frac{Glat}{Gver}} = cnst(V_{PRFM}) \quad (15)$$

As already indicated above, a difficulty which may be encountered when embodying the network according to the invention, consists in the risk: of certain pairs of transistors being matched to only a mediocre degree, this possibly giving rise to errors in the determination of quantities calculated in each cell.

The circuit of FIG. 9 is less sensitive to this defect than the setups described with regard to the first embodiment of the invention, as regards the current source 2a and the use of the current $I_{mean}$. Thus, the current $I_0$ being injected into each cell, it nevertheless in part diffuses laterally through the network so that any difference between the currents injected into the neighboring cells will be spatially filtered. As far as the current $I_{mean}$ is concerned, it serves merely to bias the lateral conductances 4a and 5a, the effect of which is not only felt in the relevant individual cell, but also laterally, since they determine the normalizing space constant.

Figure 10:
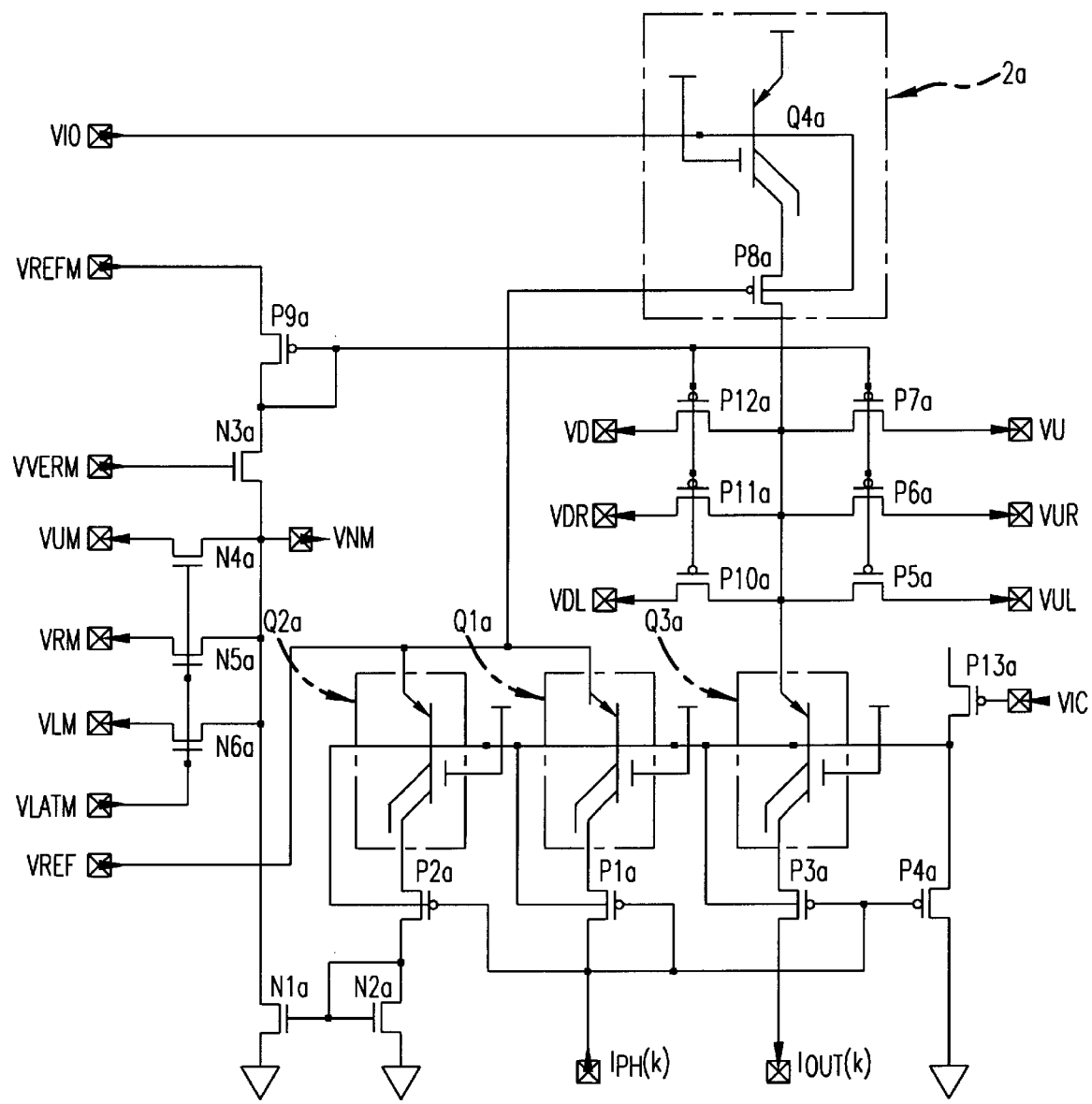
FIG. 10 is a diagram of a cell of a two-dimensional image sensor connected according to a hexaganol layout and using the basic principle of the second embodiment of the invention.

FIG. 10 represents a variant of the cell of FIG. 9, in which the transistor matching defect is still further eliminated by virtue of the use of CLTB transistors, these transistors exhibiting better matching, by at least an order of magnitude, than that of MOS transistors. Furthermore, by way of illustration, in this case, the cell is intended to be used in a network of hexagonal type, which means that it communicates with six neighboring cells at the same time. A CLTB transistor Q4 is provided in the current source 2a, an auxiliary MOS transistor P8a being connected to its collector terminal.

Similarly, each transistor P1a, P2a and P3a is here associated with a respective CTLB transistor Q1, Q2 and Q3, the collector of the latter being linked to the relevant MOS transistor. The lateral connections are effected by the respective transistors N4a, N5a, N6a, P5a, P6a, P7a, P10a, P11a and P12a.

It will be noted that the second embodiment can be equipped with an adaptive filter such as described above within the framework of the first embodiment.

We claim:

1. A network of photosensitive cells ($C_n$ $C_{n+1}$, $C_{n-1}$; k, k−1; k+1) each cell of which is intended to provide an output signal ($S_n$) representative of the local contrast in the zone in which this cell is situated within the network, wherein each cell comprises:
   a photosensitive element (12; 1a) delivering a current ($I_{ph}$; $I_{ph}(k)$) representative of local illumination in said zone;
   a calculating circuit (9; N3a, N4a, P3a) which, from said representative current ($I_{ph}$; $I_{ph}(k)$) and from predetermined quotas of the representative currents developed in at least some of the neighboring cells in the network of the relevant cell, generates a mean current ($I_{mean}$; $I_{mean}(k)$);
   a second calculating circuit which, on the basis of said representative current ($I_{ph}$; $I_{ph}(k)$) and of said mean current ($I_{mean}$; $I_{mean}(k)$), generates a measurement current ($I_{log}$; $I_{out}(k)$) which depends in a monotonic increasing and saturating manner on the ratio of the representative current to the mean current, the said ratio representing the local contrast of the relevant cell, and means (10) for generating said output signal ($S_n$) as a function of said measurement current ($I_{log}$; $I_{out}(k)$).

2. The network of photosensitive cells as claimed in claim 1, wherein said second calculating circuit (9) is arranged so as to generate said measurement current ($I_{log}$) in such a way that it results from a sigmoidal compression of said ratio between the current ($I_{ph}$) representative of the local illumination and said mean current ($I_{mean}$).

3. The network of photosensitive cells as claimed in claim 2, wherein each cell comprises a current divider (8) including a constant current source (1) feeding into first and second adjustable conductances (P1, P2; P3, P4) having a sigmoidal transfer function, the first (P1, P2) of said conductances being regulated by the current ($I_{ph}$) flowing in said photosensitive element (12) and wherein the second of said conductances (P3, P4) is regulated by the mean current ($I_{mean}$) developed in said calculating circuit (9).

4. The network of photosensitive cells as claimed in claim 3, wherein said first and second conductances are each formed by a transistor (P2, P3) to the control electrode of which are applied respectively a signal representative of the current ($I_{ph}$) flowing in said photosensitive element (12) and a signal representative of said mean current ($I_{mean}$).

5. The network of photosensitive cells as claimed in claim 4, wherein a control transistor (P1, P4) is associated respectively with each of the transistors (P2, P3) forming said conductances, these control transistors (P1, P4) being respectively traversed by the current ($I_{ph}$) flowing in said photosensitive element (12) and by said mean current ($I_{mean}$) and their control electrodes being connected respectively to the control electrodes of said conductance-forming transistors (P2, P3).

6. The network of photosensitive cells as claimed in any one of claims 1 to 5, wherein the mean current ($I_{mean}$) calculating circuits (9) of said cells ($C_n$, $C_{n-1}$, $C_{n+1}$) together form a diffusing network, each calculating circuit comprising a vertical branch (P8, N1) traversed by the current ($I_{ph}$) representative of the current flowing in said photosensitive element (12), and a lateral branch (P9) connected in series with all the lateral branches of the circuits of all the other cells, and wherein said mean current ($I_{mean}$) is tapped off from said vertical branch (P8, N1).

7. The network of photosensitive cells as claimed in claim 1, wherein said second calculating circuit is arranged so as to generate said measurement current ($I_{out}$) according to the equation:

$$I_{out}(k, l) \cong I_0 \cdot \int_{k, l} f_R(k, l) \cdot \frac{I_{ph}(k, l)}{f_R(k, l) * I_{ph}(k, l)} \cong I_0 \int_{k, l} f_R(k, l) \cdot \frac{I_{ph}(k, l)}{I_{mean}(k, l)}$$

in which: $I_{out}$ measurement current;
   k and l X and Y indices of a relevant cell in the two-dimensional network;
   $I_0$ current delivered by a current source provided in each relevant cell;
   $f_R$ convolution kernel of Gaussian shape
   $I_{ph}$ current in the photoreceptor
   $I_{mean}$ mean current.

8. The network of cells as claimed in claim 7, wherein each cell (k−1, k, k+1) comprises a constant-current source (2a), a vertical conductance (3a) connected to this source and traversed by said measurement current ($I_{out}(k)$), the value of said vertical conductance being rendered proportional to the incident luminance detected by said photosensitive element (1a), the node between said source and said vertical conductance being connected to at least two lateral conductances (4a, 5a) whose value is modulated by said mean current ($I_{mean}(k)$).

9. The network of cells as claimed in claim 8, wherein, in each cell, said vertical conductance is formed by at least a first transistor (P2a) operating in weak inversion and whose control electrode is controlled by at least one second transistor (P1a) traversed by the current ($I_{ph}(k)$) developed by said photosensitive element (1a), whereas said lateral conductances (4a and 5a) are formed by fourth and fifth transistors (P4a, P5a) operating in weak inversion and whose control electrode is controlled by a sixth transistor (P6a) traversed by said mean current ($I_{mean}(k)$) and whose main paths are joined to the respective counterpart transistors situated in the neighboring cells (k−1, k+1).

10. The network of photosensitive cells as claimed in anyone of claims 4, 5 and 9, wherein said transistors include MOS transistors.

11. The network of photosensitive cells as claimed in anyone of claims 4, 5 9, wherein said transistors include bipolar transistors.

12. The network of photosensitive cells as claimed in anyone of claims 4, 5 and 9, wherein said transistors include MOS CLBT transistors.

13. The network of photosensitive cells as claimed in any one of claims 4, 5 and 9, wherein it also comprises a biasing circuit (11), common to all the cells ($C_n$, $C_{n-1}$, $C_{n+1}$), and wherein the vertical and lateral branches of said calculating circuit (9) include transistors (P8, P9) whose control electrodes are biased by said commnon biasing circuit (11).

14. The network of photosensitive cells as claimed in claim 1, wherein each cell also comprises an adaptive low-pass filter (10) forming said means for formulating said output signal ($S_n$), so as to improve the signal/noise ratio in the region of weak illumination of each cell.

15. The network of photosensitive cells as claimed in claim 14, wherein the low-pass filters (10) of all the cells form a diffusing network, each filter comprising a vertical branch (P11, N3) traversed by said measurement current ($I_{log}$) and formed by a conductance varying as a function of said mean current ($I_{mean}$), and a lateral branch (P10) connected in series with the lateral branches of the filters (10) of all the other cells, and wherein said output signal ($S_n$) is tapped off from the vertical branch (P11, N3) of this filter.

16. The network of photosensitive cells as claimed in claim 15, wherein the lateral and vertical branches of said filter (10) each comprise at least one transistor (P10, P11, N3) and wherein the transistors (P10) of the lateral branches are biased by a common biasing circuit (11), whilst one of the transistors (P11) of the vertical branch is controlled by a signal which is dependent on said mean current ($I_{mean}$).

17. The network of photosensitive cells as claimed in claim 15, wherein the lateral and vertical branches of said filter (10) each comprise a transistor (P10, P11, N3) and wherein the transistor of the lateral branch is controlled by the mean current ($I_{mean}$) calculated in the corresponding cell, whilst the transistors of all the vertical branches of the cells are biased by a common biasing circuit (11).

* * * * *